(12) United States Patent  
James

(10) Patent No.: US 6,513,300 B1
(45) Date of Patent: Feb. 4, 2003

(54) WALL CLADDING ANCHORAGE

(75) Inventor: Peter James, Gwent (GB)

(73) Assignee: International Intec Trading, Vaduz (LI)

( * ) Notice: Subject to any disclaimer, the term of this patent is extended or adjusted under 35 U.S.C. 154(b) by 0 days.

(21) Appl. No.: 09/624,339

(22) Filed: Jul. 24, 2000

(30) Foreign Application Priority Data

Jul. 24, 1999 (GB) .............................................. 9917398

(51) Int. Cl.⁷ ................................................. E04B 1/38
(52) U.S. Cl. ............................ 52/704; 52/699; 52/379; 52/508; 52/742.15; 52/742.16; 405/259.5; 411/258
(58) Field of Search ........................... 52/703, 704, 698, 52/699, 508, 513, 378, 379, 708, 742.13, 742.15, 742.16, 745.21, 127.4; 405/259.5; 411/258, 82

(56) References Cited

U.S. PATENT DOCUMENTS

| 3,108,404 | A | * | 10/1963 | Lamb ........................ 52/704 X |
| 4,001,989 | A | * | 1/1977 | Fischer ................ 52/743.15 X |
| 4,028,857 | A | * | 6/1977 | Fischer ..................... 52/704 X |
| 4,096,672 | A | * | 6/1978 | Fischer et al. ............ 52/704 X |
| 4,214,416 | A | * | 7/1980 | Fischer ........................ 52/704 |
| 4,355,933 | A | * | 10/1982 | Fischer ..................... 52/744 X |
| 4,473,984 | A | * | 10/1984 | Lopez ...................... 52/379 X |
| 4,631,889 | A | * | 12/1986 | Adam et al. .................. 52/565 |
| 4,930,284 | A | * | 6/1990 | Falco .......................... 52/704 |
| 5,003,749 | A | * | 4/1991 | Harke ..................... 52/704 X |
| 5,007,780 | A | * | 4/1991 | Hoffmann et al. ........ 52/707 X |

\* cited by examiner

Primary Examiner—Lanna Mai
Assistant Examiner—Winnie Yip
(74) Attorney, Agent, or Firm—Young & Thompson

(57) ABSTRACT

A wall cladding anchorage has a rod with ends loosely enveloped by fabric sleeves. The wall is drilled to receive one end and the cladding is drilled, or otherwise formed with a cavity, to receive the other end. Either the wall or the cladding may have the anchorage fixed first, by grout being injected to expand the sleeve and seep through it to bond to the drilling or cavity wall. Then the cladding is offered up and the other sleeve likewise expanded, the grout being injected via a duct leading between the cladding and the wall. Instead of a single part rod, there may be two elements, such as a tube and a rod that screws into it, each with a sleeve so that the cladding or wall need not have significantly projections until shortly before the cladding is fixed. It is also possible to have a single sleeve over the whole rod and inject grout into its central zone, between the wall and cladding.

15 Claims, 5 Drawing Sheets

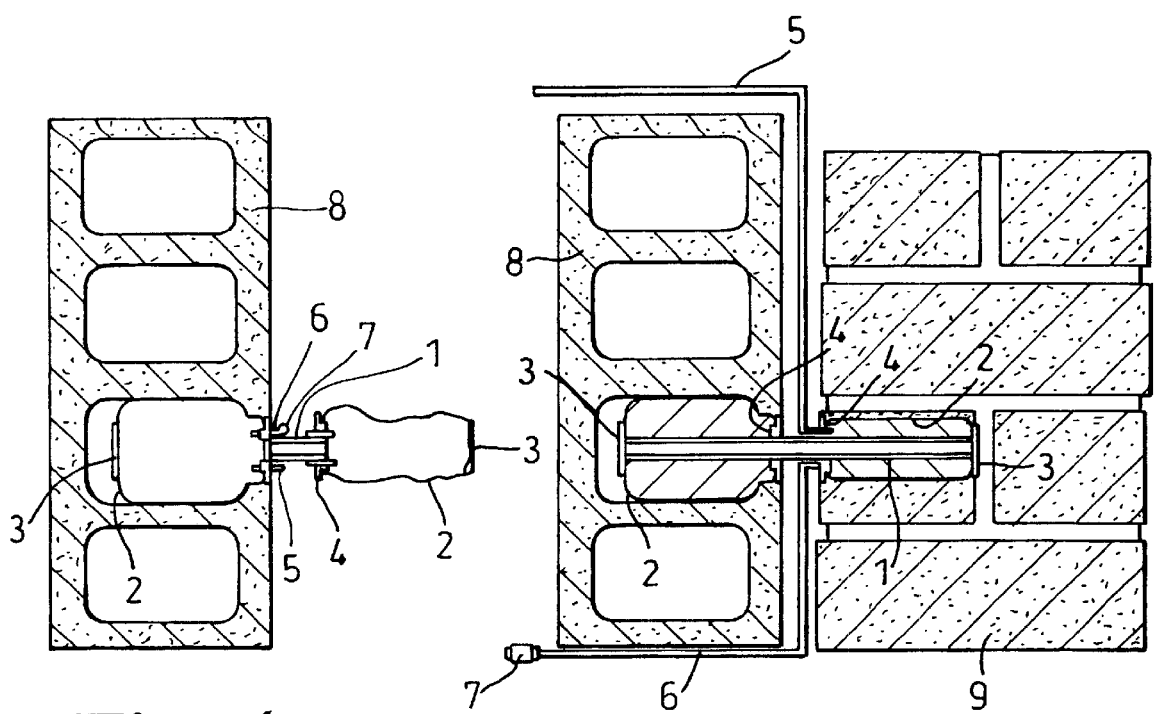
*Fig. 4*   *Fig. 5*
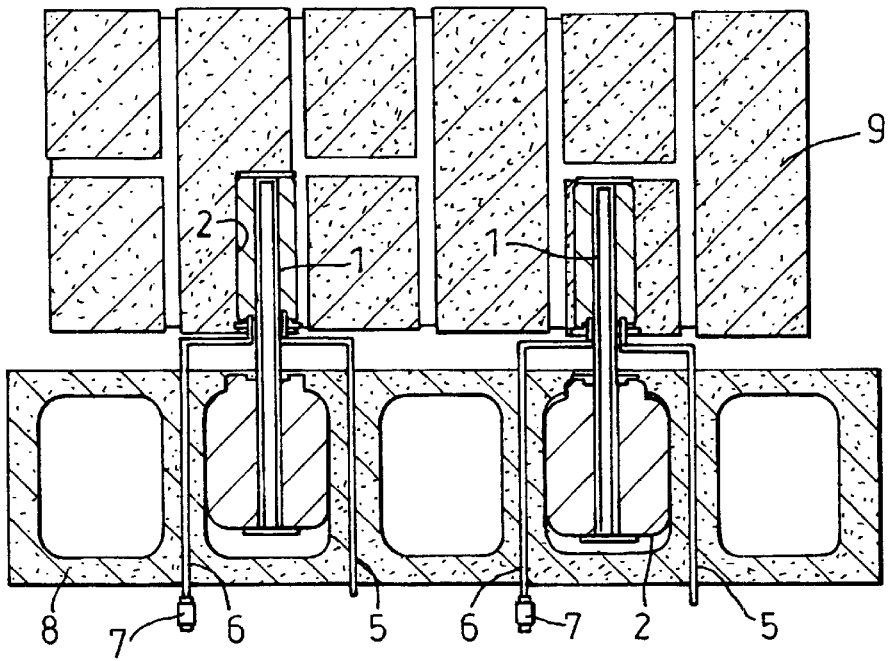
*Fig. 6*

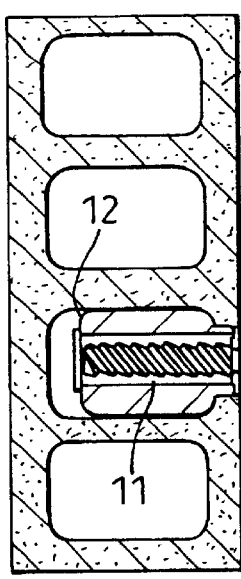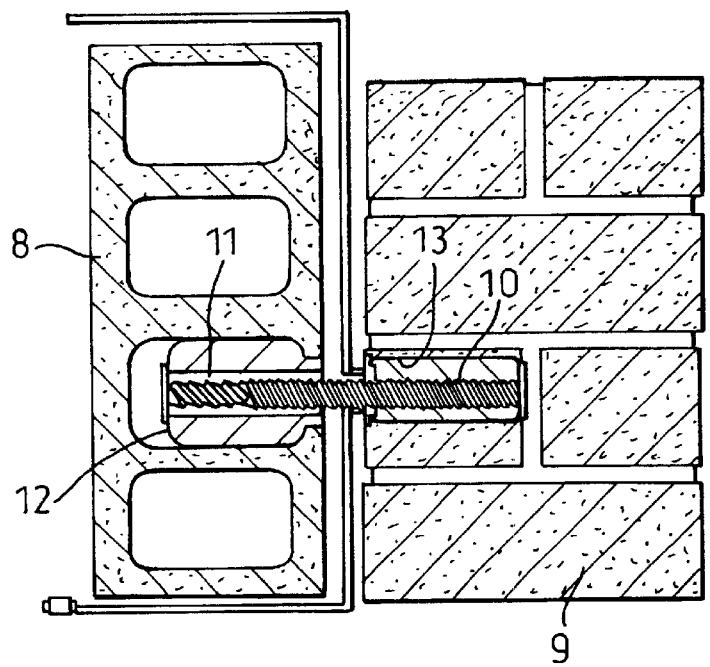
*Fig. 7*  *Fig. 8*
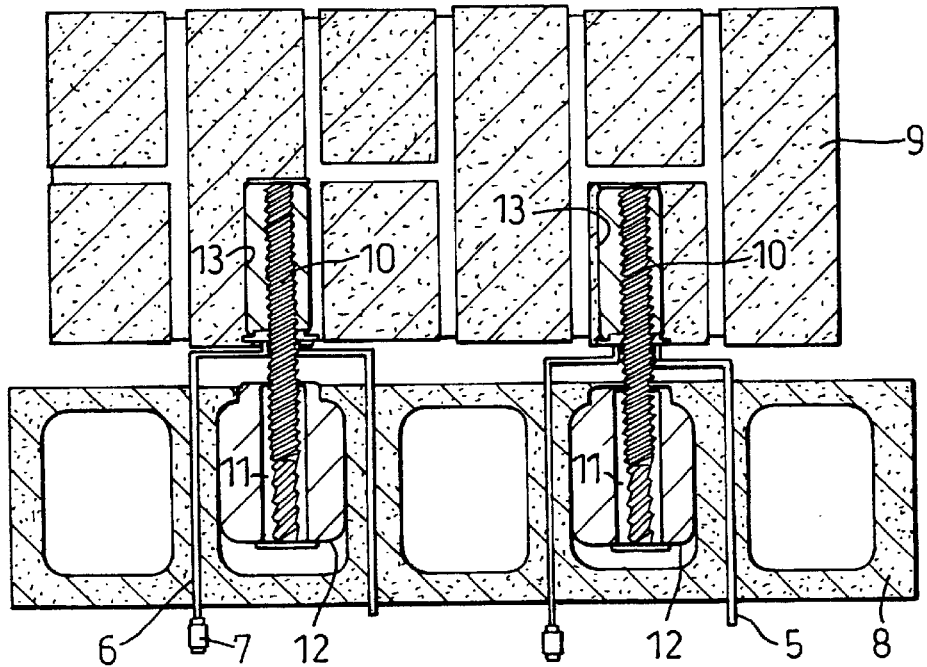
*Fig. 9*

WALL CLADDING ANCHORAGE

FIELD OF THE INVENTION

This invention relates to wall cladding anchorage.

BACKGROUND OF THE INVENTION

Many buildings have a basic structure of brick, blocks or concrete sheathed by panels or some form of cladding that can make them look more attractive, as well as adding to the insulation and weather proofing.

However, the attachment of such cladding needs to be secure and long-standing, which is not always the case.

There have been developed and in use for many years now wall ties that can be inserted and secured in position through the outer leaf of a cavity wall, to take over from the original wall ties which tend to rust away. These replacement wall ties are generally stainless steel rods, some with expansion bolt arrangements and others enveloped by a loose fabric sleeve. When the latter are inserted into a drilling in a wall, grout is injected under pressure from the outer end to expand the sleeve against the wall of the drilling. When the grout has set hard, the tie is locked in place.

SUMMARY OF THE INVENTION

The present invention adapts this type of tie to the securing of wall cladding.

According to one aspect of the present invention there is provided a cladding anchor comprising a rigid elongate member, fabric sleeves loosely enveloping each end portion of said member, and means for admitting grout under pressure into those sleeves at their inner adjacent ends.

The elongate member will preferably be a stainless steel rod, and the sleeves should advantageously be axially confined between radial abutments. Thus, when grout is injected they can only expand radially. These abutments may be, at the inner ends of the sleeves, washer-like plates secured near the mid-length of the rod, while the ends of that rod may be capped by discs which form the outer end abutments.

The means for admitting the grout may simply be a duct, conveniently of flexible plastics tube, leading through washer-like discs forming the radial abutments at the inner, adjacent ends of the sleeves.

As will be apparent later, the filling of the sleeves with grout cannot be monitored directly, and therefore preferably there will be means for determining at a remote point when each sleeve is filled with grout. This may be another duct from the inner end of the sleeve which serves as a vent for grout. When grout emerges from the exposed end, that will be a signal that the filling operation is complete.

According to another aspect of the present invention there is provided a method of attaching cladding to a building, the method comprising:

(a) drilling into the wall of the building, (b) inserting one end of an anchor as defined above into each drilling, (c) injecting grout into the fabric sleeves on said one ends to expand the sleeves against the drilling walls and allowing the grout to set, leaving the other ends projecting, (d) drilling or otherwise creating or using blind cavities in the reverse side of the cladding which will register with the drillings in the wall, (e) offering up the cladding so that the projecting ends of the anchors enter the cavities, and (f) injecting grout into the fabric sleeves of said other ends via ducts leading between the cladding and the wall, to expand the sleeves against the cavity walls, and allowing the grout to set.

According to a further aspect of the present invention there is provided a method of attaching cladding to a building, the method comprising:

(a) drilling, or otherwise creating or using, blind cavities in the reverse side of the cladding, (b) inserting one end of an anchor as defined above into each cavity, (c) injecting grout into the fabric sleeves on said one ends to expand the sleeves against the cavity walls and allowing the grout to set, leaving the other ends projecting, (d) drilling into the wall of the building at points which will register with the cavities in the cladding, (e) offering-up the cladding so that said other projecting ends of the anchors enter the drillings, and (f) injecting grout into the fabric sleeves of said other ends via ducts leading between the cladding and the wall, to expand the sleeves against the drilling walls, and allowing the grout to set.

According to a yet further aspect of the present invention there is provided a cladding anchor comprising two rigid elongate elements connectable into a single rigid elongate member, fabric sleeves loosely enveloping said elements but separated when the single member is formed, and means for admitting grout under pressure into those sleeves at the ends which are adjacent when the single member is formed.

Conveniently, one element is a tube into which the other element, a rod, screws. Again the sleeves are preferably axially confined between radial abutments, and the means for admitting the grout may comprise ducts of flexible plastics tube leading through washer-like discs forming the radial abutments at the adjacent ends of the sleeves when the single member is formed. There will also conveniently be means for determining at a remote point when each sleeve is filled with grout, such as a duct from said adjacent end of the sleeve which serves as a vent.

According to yet another aspect of the present invention there is provided a method of attaching cladding to a building, the method comprising:

(a) drilling into the wall of the building, (b) inserting one element of a two element anchor as just defined into each drilling, (c) injecting grout into the fabric sleeves on said one elements to expand the sleeves against the drilling walls and allowing the grout to set, leaving the other ends projecting, (d) drilling, or otherwise creating or using, blind cavities in the reverse side of the cladding which will register with the drilling in the wall, (e) connecting the other elements to said one elements to form said members, (f) offering up the cladding so that said other elements of the anchors enter the cavities, and (g) injecting grout into the fabric sleeves of said other elements via ducts leading between the cladding and the wall, to expand the sleeves against the cavity walls, and allowing the grout to set.

According to a still further aspect of the present invention there is provided a method comprising:

(a) drilling, or otherwise creating or using, blind cavities in the reverse side of the cladding, (b) inserting one element of a two element anchor as just defined into each cavity, (c) injecting grout into the fabric sleeves on said one ends to expand the sleeves against the cavity walls and allowing the grout to set, leaving the other ends projecting, (d) drilling into the wall of the building at points which will register with the cavities in the cladding, (e) connecting the other elements to said one elements to form said members, (f) offering-up the cladding so that said other elements of the anchors enter the drillings, and (g) injecting grout into the fabric sleeves of said other elements via ducts leading between the cladding and the wall, to expand the sleeves against the drilling walls, and allowing the grout to set.

Thus in the method where the anchorage is first fixed to the back of the cladding, the cladding can have the tubes fitted first, without the rods. This will allow the cladding to be packaged and transported without the problems and hazards of projecting rods. Those can be fixed on site just before the offering-up step.

However, in some circumstances it may be desirable to fit the rods to the cladding, leaving the portions that engage in the tubes projecting. The tubes are attached immediately before fitting to the wall. There may be a selection of different tubes, all capable of being engaged by the basic rod, but with different dimensions to suit the drillings in the wall and the load to be sustained.

It is possible to reverse this, and either fit the tube in the wall first, engage the rod and then offer-up the cladding, or anchor the rod in the wall with the tube-engaging end projecting, fit a suitable tube, and then offer up the cladding over that.

According to one more aspect of the present invention there is provided a cladding anchor comprising a rigid elongate member, a fabric sleeve loosely enveloping said member, and means for admitting grout under pressure into the sleeve at a point intermediate its ends.

Preferably, the sleeve is axially confined between radial abutments at each end, and there will generally be a vent from another intermediate point. Also, at the intermediate zone where the grout is admitted, there should advantageously be means to maintain the rod co-axial with the sleeve. This may be an annulus held co-axially on the rod and fitted or formed with the means for admitting and venting grout. In use, this annulus will engage through the sleeve the mouth of a drilling or cavity into which either end is entered.

According to an extra aspect of the present invention there is provided a method of attaching cladding to a building; the method comprising:

(a) drilling into the wall of the building, (b) inserting one end of a single fabric sleeve anchor as defined above into each drilling, (c) drilling, or otherwise creating or using, blind cavities in the reverse side of the cladding which will register with the drillings in the wall, (d) offering up the cladding so that the other ends of the anchors enter the cavities, and (e) injecting grout into the fabric sleeves via ducts leading between the cladding and the wall, to expand the sleeves against the drilling and cavity walls, and allowing the grout to set.

According to one further aspect of the present invention there is provided a method of attaching cladding to a buildings, the method comprising:

(a) drilling, or otherwise creating or using, blind cavities in the reverse side of the cladding which will register with the drillings in the wall, (b) inserting one end of a single fabric sleeve anchor as defined above into each cavity, (c) drilling, into the wall of the building, (d) offering up the cladding so that the ends of the anchors enter the drillings, and (e) injecting grout into the fabric sleeves via ducts leading between the cladding and the wall, to expand the sleeves against the drilling and cavity walls, and allowing the grout to set. Step (c) may precede steps (a) and (b), in both methods.

BRIEF DESCRIPTION OF THE DRAWINGS

For a better understanding of the invention, some embodiments will now be described, by way of example, with reference to the accompanying drawings, in which:

FIG. 4 is a section through a terra cotta block with an anchorage fitted by which it can be secured to a wall, FIG. 5 is another section of that block and part of the wall to which it is attached by the anchorage, FIG. 6 is a horizontal section through part of the wall showing two such anchorages, and FIGS. 7, 8 and 9 are similar to FIGS. 1, 2 and 3, but with a modified anchorage.

DETAILED DESCRIPTION OF THE INVENTION

Figure 1:
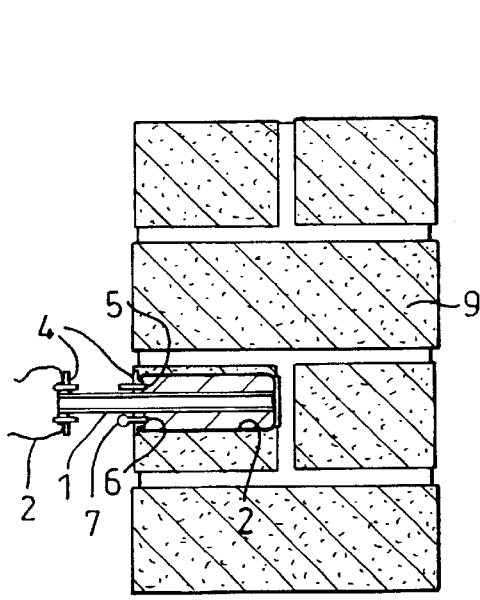
FIG. 1 a section through part of a wall with an anchorage installed.

In FIGS. 1 to 6, each anchorage comprises a stainless steel rod 1 enveloped over its two end portions by fabric sleeves 2. These are axially confined by disc plates 3 capping the ends of the rod and abutments 4 of washer-like form secured either side of the mid-point of the rod 1. The sleeves are secured at both their ends so that when expanded into cylindrical form they each form an elongate annular chamber around the rod 1. The plates 4 have two apertures to which are respectively connected small bore flexible tubes 5 and 6, one pair of which generally needs to be substantially longer than the other. The tubes 6 each terminate in a small fabric sleeve or sock 7 similar to the sleeves 2, but in miniature.

These anchorages are used to secure blocks 8 to a wall 9 in either of two ways, these blocks being assumed to be of terra cotta in this example.

Figure 2:
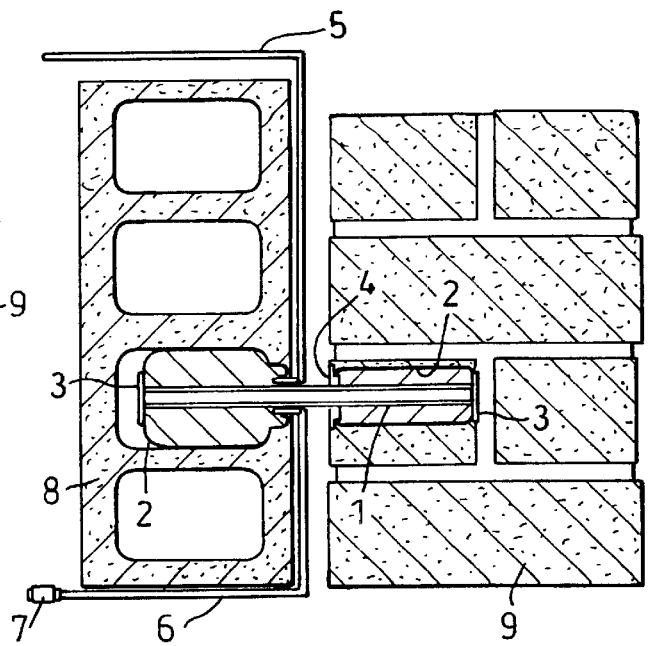
FIG. 2 is another section through the wall with that anchorage, but now supporting a terra cotta block.
Figure 3:
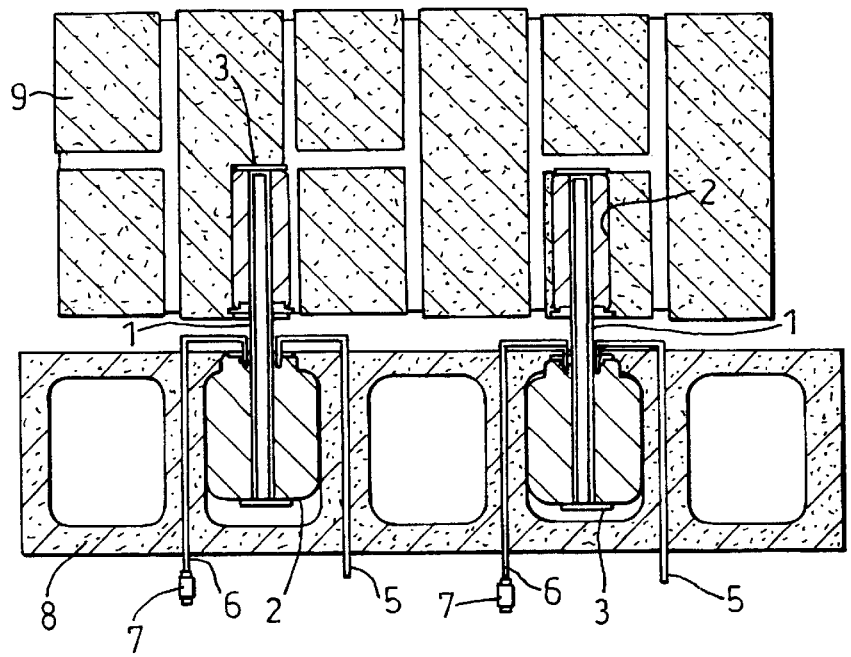
FIG. 3 is a horizontal section through part of the wall showing two such anchorages.

In FIGS. 1 to 3, the wall 9 is drilled at various selected positions sufficiently deep to receive one sleeved end portion of an anchorage. A jig may be necessary to hold the rod 1 co-axial to the drilling, but when it is in position, grout is injected through the plate 4 at the mouth of the drilling to fill and expand the sleeve 2. The grout is injected through the short tube 5, and when the sleeve is full, grout will be forced out through the short tube 6 acting as a vent, until it appears in the sock 7. The installer will then know that this part of the operation is complete. When the grout is set, the anchorage will present its unexpanded sleeve ready for co-operation with a block 8. The projecting parts of the used tubes 5 and 6 may be cut off and discarded, The terra cotta blocks 8 are of cellular form, and the anchorages will have been set in the wall 9 at positions where they will register with various selected cells when the block 8 is at the desired position. A template will have been used to guide the drilling. The reverse side of the block 8 is also drilled, opening into the selected cells, The block is offered up to the wall so that the projecting anchorages enter the associated cells until the sleeves (which can expand to a larger radius than the ones in the wall) are within the block. The long tubes 5 and 6 are run behind the block 8 (a gap is left between the block and the wall) and out to accessible points.

Grout is then injected through the tubes 5 and the sleeves 2 expand substantially to fill the cells. Again, completion of this operation is indicated by "venting" through the tubes 6. When the grout has set, the block is secure.

The tubes 5 and 6 may be severed where they emerge from behind the block 8, or they may be embedded in a mortar joint, in which case they can be nipped off at the front and pointed over.

FIGS. 4 to 6 illustrate the reverse of this arrangement, and will therefore not be described in such detail. The anchorages are fitted to the block 8 first, leaving them projecting from the rear face. The wall is drilled at corresponding points, the block 8 is offered up so that the is anchorages enter the drillings, and then grout is injected into the sleeves within the wall.

In FIGS. 7 to 12, there is a modified anchorage where instead of a single stainless steel rod there are two parts. One is a rod 10 and the other is a tube 11 into which one end of the rod can engage. Conveniently, the engagement is a screw-threaded one, and will be referred to as such hereafter, but there could be other forms of engagement, such as a clip fit, or a bayonet fitting. The tube 11 carries an enveloping sleeve 12 and has end abutments corresponding to the abutments 3 and 4, and the end of the rod that does not screw into the tube carries another enveloping sleeve 13 likewise confined between radial abutments.

With this anchorage, the tube 11 can be fixed within the block 8 as shown in FIGS. 7 to 9, and although the rod 10 is conveniently used during the fixing operation to hold the tube in the correct position, it can then be removed until shortly before the block is fixed to the wall. Thus, the block has no awkward projections and is easier to store and transport.

When the block is to be installed, the rod 10 is screwed into the tube and its fabric sleeved end is entered into the drilling in the wall and inflated by grout as described above.

Figure 10:
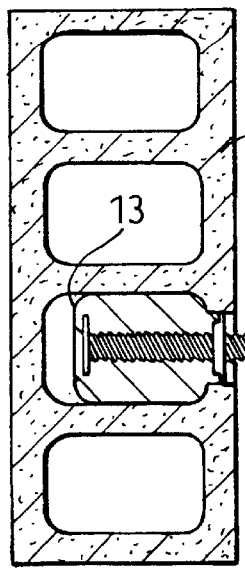
FIGS. 10, 11 and 12 are similar to FIGS. 4, 5 and 6, but with the modified anchorage.
Figure 11:
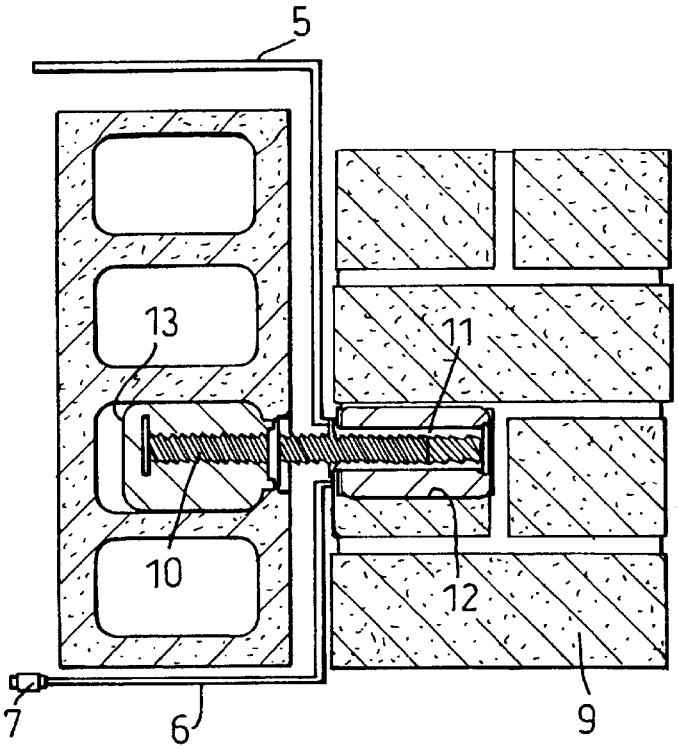
Figure 12:
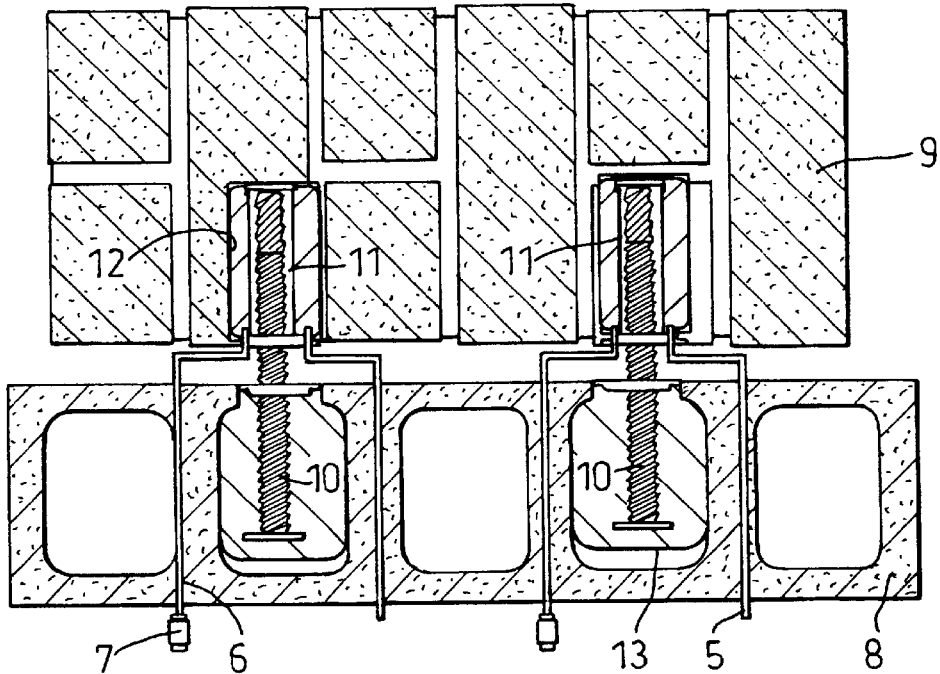

In FIGS. 10 to 12, the arrangement is reversed and the tube 11 is screwed onto the rod 10 projecting from the block 8, and the tube with its sleeve is inserted into the wall.

The term rod used herein implies an elongate member of solid circular section. It will be understood that it is intended to embrace any rigid elongate member of various cross-sections, and even two or more such members arranged in parallel with common sleeves for the grout.

It may also have been assumed that the same grout is used at both ends. This is not necessarily so. In particular, while the end that is embedded in the wall may be secured by purely cementitious grout, the end within the block, which generally requires considerably more grout, may be bulked out by fine aggregate. For lightness and good insulating properties a recommended aggregate is pumice. Of course, the injection tube 5 will be dimensioned comfortably to accept such grout.

Another possibility is to mix rubber or plastic fibres or particles with the grout. A sufficient density will give a small amount of resilience to the anchorage, sufficient to allow certain vibrations, from minor earthquakes or distant explosions for example, to be damped out rather than cause cracking, particularly of brittle terra cotta blocks.

Figure 13:
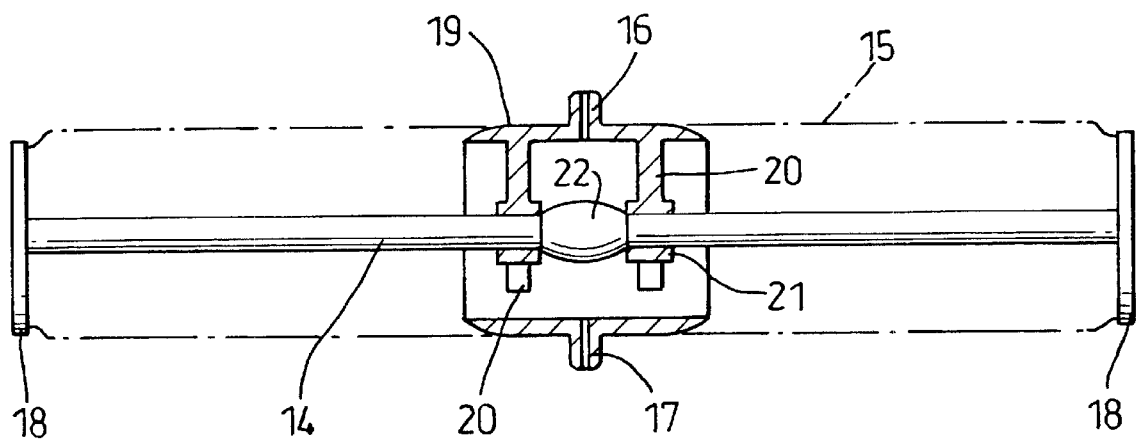
FIG. 13 is an axial section of another anchorage.

Instead of fixing a block in stages, using anchorages with separate sleeves at opposite ends, it may be achieved in a single operation using an anchorage as shown in FIG. 13. This has a rod 14 encased in a single fabric sleeve 15 over its entire length. At about its mid-length there is a nipple 16 for connecting a grout injecting tube and another nipple 17 for a vent tube. At one end, at least, 15 of the rod there is a co-axial disc 18 whose diameter is fractionally less than that of the drilling in the wall into which that end is to be entered. But in a terra cotta block, with a relatively large cell opening from a narrow aperture in the reverse side, such a disc will not help centre the rods, which will sag from the end within the wall. Filling the sleeve with grout will not raise the rod. Therefore, to keep the rod co-axial with the drilling in the wall, and to make the fitting of the block easy, there has to be some other support within the sleeve.

Figure 14:
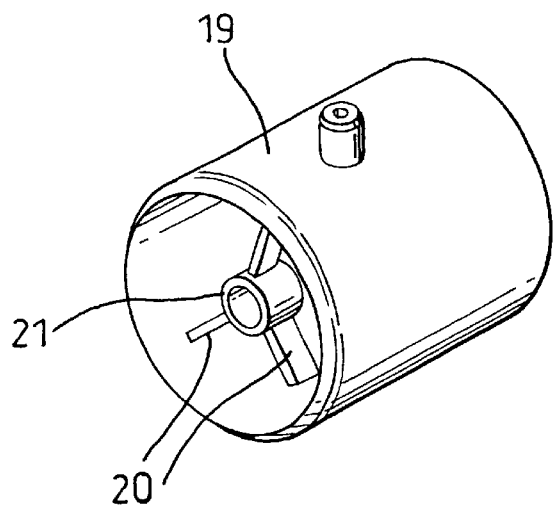
FIG. 14 is a perspective view of part of that other anchorage.

One possible arrangement is a plastics moulding comprising a short tube 19 held at each end by a spider of radial arms 20 from a hub 21 that fits closely over the rod 14, as shown in FIG. 14. To keep the tube 19 located at the desired intermediate position along the rod, the hubs may snap into shallow annular grooves in the rod or one hub may be snapped past a low annular rib 22, as shown, The nipples 16 and 17 are conveniently integrally formed with the tube 19 and project through the sleeve 15. The outer cylindrical surface of the tube 19 may taper in slightly at each end so that it will wedge into the mouth of the drilling in the wall and into the aperture in the back of the terra cotta block. This will nip the fabric sleeve 15 that shrouds the tube 19 and cut off the part that actually overlies the tube from the injected grout.

For fitting a block, the wall is drilled as described above, the drillings are fitted with anchorages, the grout injection and venting tubes are connected, and the block is offered up normal to the wall so that the projecting ends of the anchorages enter the prepared apertures in the back of the block. When the block is correctly positioned the grout is injected to expand the sleeve, and once hardened the operation is complete.

The fabric sleeve 15 has to expand more within the terra cotta block than within the drilling in the wall. If it is of knitted construction with at least some elastic fibres this should not be a problem. However, in some circumstances it may be necessary to have a sleeve of non-uniform cross-section, one end being larger than the other.

What is claimed is:

1. A cladding anchor comprising a rigid elongate member having first and second end portions and a center portion, fabric sleeves each having an inner and outer end, said sleeves loosely enveloping each of the first and second end portions of said rigid elongate member such that said inner ends of said sleeves are positioned adjacent and spaced apart each other at said center portion of said rigid elongate member, and means for admitting grout under pressure into said sleeves at their inner adjacent ends, wherein the sleeves are axially confined between radial abutments fitted on the inner and outer ends of said sleeves and the means for admitting the grout comprises ducts of flexible tube leading through washers-shaped discs which form the radial abutments fitted at the inner adjacent ends of the sleeves.

2. A cladding anchor as claimed in claim 1, and further comprising means for determining when each sleeve is filled with grout.

3. A cladding anchor as claimed in claim 2, wherein the determining means is a duct from the inner end of the sleeve which serves as a vent for grout.

4. A method of attaching cladding to a building, the cladding having a front side to remain exposed and a reverse side to confront a wall of the building, the method comprising:

(a) providing blind cavities in the reverse side of the cladding, (b) inserting a first end portion of a rigid elongate member of an anchor as claimed in claim 1 into each cavity, (c) injecting grout into the fabric sleeves on said first end portions of said rigid elongate members to expand the sleeves against the walls of the blind cavities and allowing the grout to set, leaving a second end portion of the anchor projecting outwardly from the cavities, (d) drilling into the wall of the building to provide drillings at points which will register with the blind cavities in the cladding, (e) offering-up the cladding so that said second projecting end portions of the anchors enter respective drillings, and (f) injecting grout into the fabric sleeves of said other ends via ducts leading between the cladding and the wall, to expand the sleeves against the drilling walls, and allowing the grout to set.

5. A method of attaching cladding to a building, the cladding having a front side to remain exposed and a reverse side to confront a wall of the building, the method comprising:

(a) drilling into the wall of the building to provide at least one drilling in said wall, (b) inserting a first end portion of a rigid elongate member of an anchor as claimed in claim 1 into each drilling, (c) injecting grout into the fabric sleeves on said first end portions of said elongate members to expand the sleeves against the drillings in said wall and allowing the grout to set, leaving a second end portions of said anchor projecting outwardly from the wall, (d) providing blind cavities in the reverse side of the cladding which will register with each drilling in the wall, (e) offering-up the cladding so that the projecting second end portions of the anchors enter the cavities, and (f) injecting grout into the fabric sleeves of said second end portions via ducts leading between the cladding and the wall, to expand the sleeves against the walls of the blind cavities, and allowing the grout to set.

6. A cladding anchor comprising first and second rigid elongate elements being separably connected into a single rigid elongate member, fabric sleeves each having an inner end and an outer end, said sleeves loosely enveloping said elements and remaining separated at the single rigid elongate members, said inner ends of said sleeves being positioned adjacent and separated apart at a central portion of the rigid elongate member, and means for admitting grott under pressure into those sleeves at their inner ends, wherein the sleeves are axially confined between radial abutments fixed at the inner and outer ends of said sleeves and the means for admitting the grout comprises ducts of flexible tube leading through washer-shaped discs which form the radial abutments at the inner ends of the sleeves.

7. A cladding anchor as claimed in claim 6, wherein one of said first and second rigid elongate elements is a tube into which the other of said other rigid elongate elements is a screw.

8. A cladding anchor as claimed in claim 6, and further comprising means for determining when each sleeve is filled with grout.

9. A cladding anchor as claimed in claim 8, wherein the determining means is a duct from said adjacent inner end of the sleeve which serves as a vent for grout.

10. A method of attaching cladding to a building, the cladding having a front side to remain exposed and a reverse side to confront a wall of the building, the method comprising:

(a) drilling into the wall of the building to provide at least one drilling in said wall, (b) inserting a first rigid elongate element of an anchor as claimed in claim 6 into each drilling, (c) injecting grout into the fabric sleeves on said first elements to expand the sleeves against the drillings in said walls and allowing the grout to set, leaving the inner ends of said first elements projecting outwardly from the wall, (d) providing blind cavities in the reverse side of the cladding which will register with a respective drilling in the wall, (e) connecting a second rigid elongate element to each of said first elements to form single rigid elongate members, (f) offering-up the cladding so that said second elements of the anchors enter the blind cavities, and (g) injecting grout into the fabric sleeves of said second elements via ducts leading between the cladding and the wall to expand the sleeves against the walls of the blind cavities, and allowing the grout to set.

11. A method of attaching cladding to a building, the cladding having a front side to remain exposed and a reverse side to confront a wall of the building, the method comprising:

(a) providing blind cavities in the reverse side of the cladding, (b) inserting a first rigid elongate element of an anchor as claimed in claim 6 into each cavity, (c) injecting grout into the fabric the sleeves on the first elements to expand the sleeves against the walls of the blind cavities and allowing the grout to set, leaving the inner ends of said first elements projecting outwardly from the cavities, (d) drillings into the wall of the building to provide drillings at points which will register with the blind cavities in the cladding, (e) connecting a second rigid elongate element of the anchor to said first rigid element to form a single rigid elongate member, (f) offering-up the cladding so that said second elements of the anchors enter the respective drillings, and (g) injecting grout into the fabric sleeves of said second elements via ducts leading between the cladding and the wall, to expand the sleeves against the drilling walls, and allowing the grout to set.

12. A cladding anchor comprising a rigid elongate member having first and second ends, a fabric sleeve having inner and outer ends, said sleeve loosely enveloping an entire length of said elongate member, means for admitting grout under pressure into the sleeve at a zone intermediate the ends of said fabric sleeve, there being at the intermediate zone where the grout is admitted, and means to maintain a rod of the elongate member co-axial with the sleeve, wherein said maintaining means is an annulus having two opposed ends being fitted co-axially on the elongate member at the intermediate zone, said sleeve is separated into two portions by the annulus at the intermediate zone, and said annulus is formed with the means for admitting grout into two said portions of said sleeve on either ends of the annulus, and the sleeve is axially confined between radial abutments fitted at each oppose ends of said sleeve.

13. A cladding anchor as claimed in claim 12, wherein a vent is provided at a further point in the intermediate zone between the ends of said sleeve.

14. A method of attaching cladding to a building, the cladding having a front side to remain exposed and a reverse side to confront a wall of the building, the method comprising:
(a) drilling into the wall of the building to provide at least one drilling in said wall,
(b) inserting one end of a rigid elongate member of an anchor as claimed in claim 13 into each drilling,
(c) providing blind cavities in the reverse side of the cladding which will register with each drilling in the wall,
(d) offering-up the cladding so that the other ends of the anchors enter the blind cavities, and
(e) injecting grout into the fabric sleeves via ducts leading through the maintaining means of the anchor disposed at the center portion of the rigid elongate member between the cladding and the wall, to expand the sleeves against the drilling and the walls of the blind cavities, and allowing the grout to set.

15. A method of attaching cladding to a building, the cladding having a front side to remain exposed and a reverse side to confront a wall of the building, the method comprising:
(a) providing blind cavities in the reverse side of the cladding which will register with the drillings in the wall,
(b) inserting one end of a rigid elongate member of an anchor as claimed in claim 13, into each blind cavity,
(c) drilling into the wall of the building to provide at least one drilling in said wall,
(d) offering-up the cladding so that the other ends of the anchors enter into each drilling, and
(e) injecting grout into the fabric sleeves via ducts leading through a maintaining means of the anchor disposed at the center portion of the rigid elongate member between the cladding and the wall, to expand the sleeves against the drilling and the walls of the blind cavities, and allowing the grout to set.

\* \* \* \* \*